INVENTORS
SERGE HARDOUIN - ROGER SALMON
BY
McDougall, Hersh - Scott ATTYS

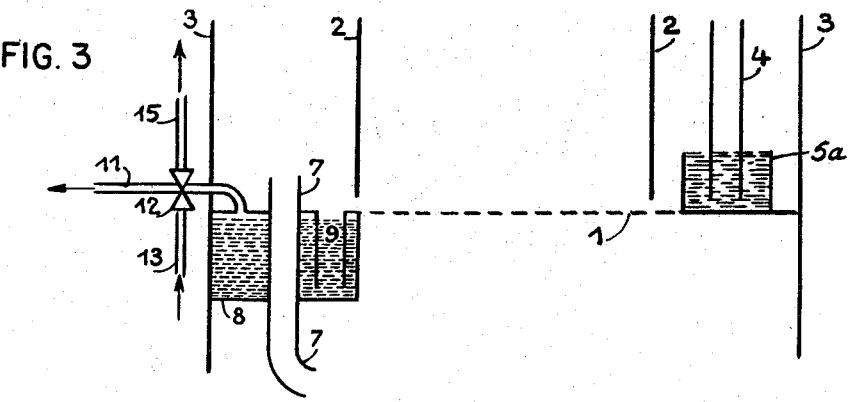
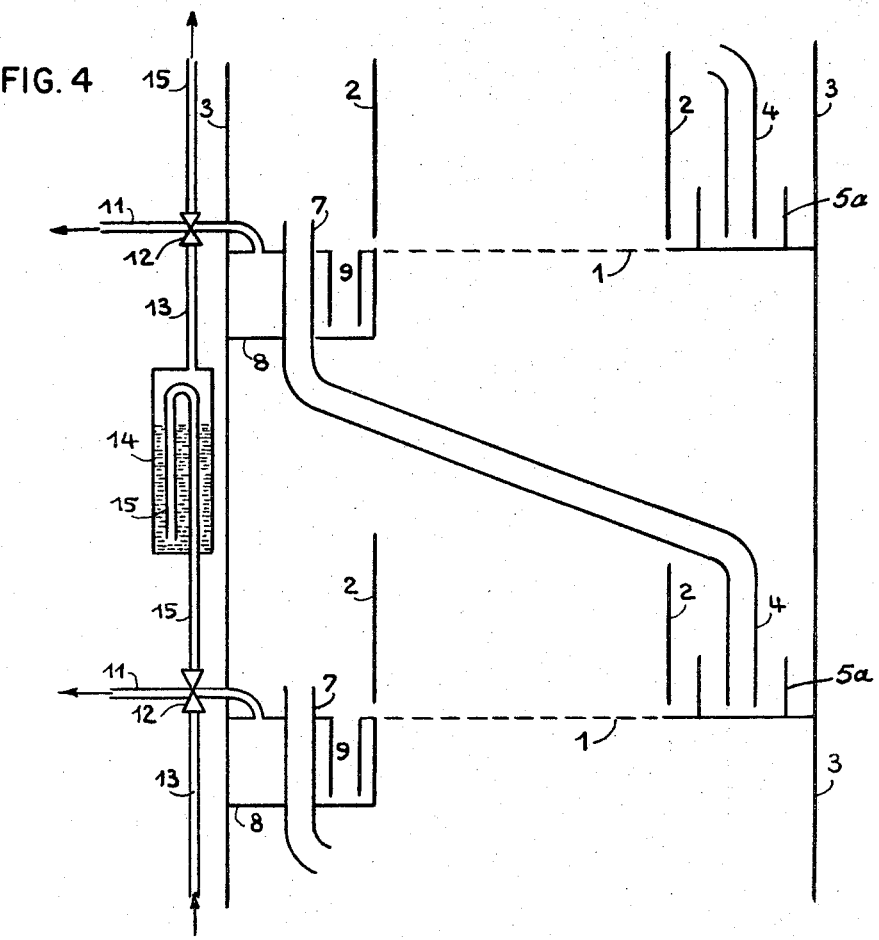

United States Patent Office 3,338,567
Patented Aug. 29, 1967

3,338,567
PLATE CONSTRUCTION FOR CONTACT TOWERS
Serge Hardouin, Sannois, and Roger Salmon, Garges-les-Gonesse, France, assignors to Produits Chimiques Pechiney-Saint-Gobain, Neuilly-sur-Seine, France
Filed Oct. 26, 1964, Ser. No. 406,464
Claims priority, application France, Oct. 31, 1963, 952,453
14 Claims. (Cl. 261—113)

This invention relates to contact towers and more particularly to the construction of perforated plates for fluid-gaseous contact during passage through the tower.

In operation, the materials are caused to flow through the tower in countercurrent flow with the gases introduced at the bottom portion for flow upwardly through the column of plates while the liquid is introduced into the upper portion for flow gravitationally downwardly. The plates are intended to increase the contacting relationship between the gaseous phase and the liquid phase in countercurrent flow. For this purpose, the plates are arranged to extend crosswise of the column in vertically spaced apart relation with the liquid flowing over the surfaces of the plates for the passage of the gases therethrough and with the liquid flowing from one plate to the other by way of an overflow or spillway from beyond a predetermined level or by controlled flow across the perforated plate, in the absenec of spillways.

More specifically, the invention is addressed to contact towers of the type described in which the plates in the column are formed with a plurality of openings of small dimension in the form of circular perforations, slots and the like which have the effect of subdividing the gaseous stream into a multiplicity of filiform currents thereby to multiply the area of surface contact between the gaseous phase and the liquid phase and thereby to increase the efficiency of exchange of material and/or heat between the contacting phases.

The liquid on the surfaces of the plates is prevented from flow downwardly through the perforations in one plate to the underlying plate by a combination of factors including the gases rising through the perforations for passage by bubbling through the layer of liquid on the surface of the plate and which often causes emulsification of the liquid in the layer, and the surface tension of the liquid forming the layer on the surface of the plate and which is constantly being renewed by the continuous flow of liquid from one plate to the next.

Thus each plate in the column is fabricated to retain a certain amount of liquid on the surface of the plate for the passage of the gaseous bubbles therethrough. During operation of the tower, the liquid making up the layer on each plate requires a physical-chemical equilibrium between the gaseous and liquid phases, the equilibrium on each plate differing somewhat from the equilibrium composition on the other plates whereby the liquid composition on each plate differs from the liquid composition on other plates during stabilized operation.

Present towers, which make use of perforated plates of the type described, and particularly those operating with overflow spillways, such as are employed in the preparation of nitric acid, are subject to the problems of loss of liquid from the plates by drainage when the gaseous phase flowing upwardly through the column is reduced in volume by as little as 15% of the designed throughput of the tower. The liquid flows via the perforations through the plates to collect at the bottom of the column whereby the liquid from one plate becomes blended with the liquid from the other plates so that each loses its individual stabilized composition or temperature.

This condition, which occurs on slowdown or upon shutdown of the tower, has a number of disadvantages. The column must be fabricated with sufficient capacity at its base to accommodate all of the liquid in the tower thereby to increase the cost of the tower. In renewing the operation of the tower, it is necessary to feed the entire blend of liquid to the top of the column in order to return the column to operating conditions by redistribution of the liquid over the surfaces of the plates. Finally, it becomes necessary to operate the column for a period of time under unstabilized, inefficient conditions before re-establishing the stabilized equilibrium in the composition and temperature of the liquid on each of the plates.

All of these operations are burdensome, time-consuming and expensive and they also result in undesirable loss of materials. Each new re-establishment of balanced conditions is preceded by a lengthy period of fluctuations in operations. The passage of material during the period of unstabilized conditions may also operate to interfere with the proper functioning of the equipment during the subsequent stabilized operation or may render the stabilization more difficult. In the final analysis, the overall efficiency of the tower is greatly reduced from a production standpoint.

It is an object of this invention to produce a plate structure for use in contact towers which obviates the many disadvantages of contact towers heretofore employed and it is a related object to produce a plate structure for contact towers which avoids the necessity for incorporating capacity in the bottom of the tower to accommodate all of the liquid in the tower; which avoids the necessity to effect redistribution of the fluid onto each of the plates of the tower for renewal of operations of the contact tower; which eliminates the necessity to operate the tower through a lengthy period of unstabilized condtiions before re-establishing equilibrium for efficient operation of the tower; which enables substantially immediate renewal of operations of the tower under stabilized equilibrium conditions following either slowdown or shutdown of the tower, and which permits continuous operation of the tower under stabilized conditions without loss of time, material or efficiency.

These and other objects and advantages of this invention will hereinatfer appear and for purposes of illustration, but not of limitation, an embodiment of the invention is shown in the acompanying drawings, in which:

FIG. 3 is a diagrammatic view similar to that of FIG. 1 showing the conditions existing during shutdown of the column; and FIG. 4 is a diagrammatic view showing a section of the tower including two plates for illustration of flow between the plate and it includes a modification for control of fluid flow.

Figure 1:
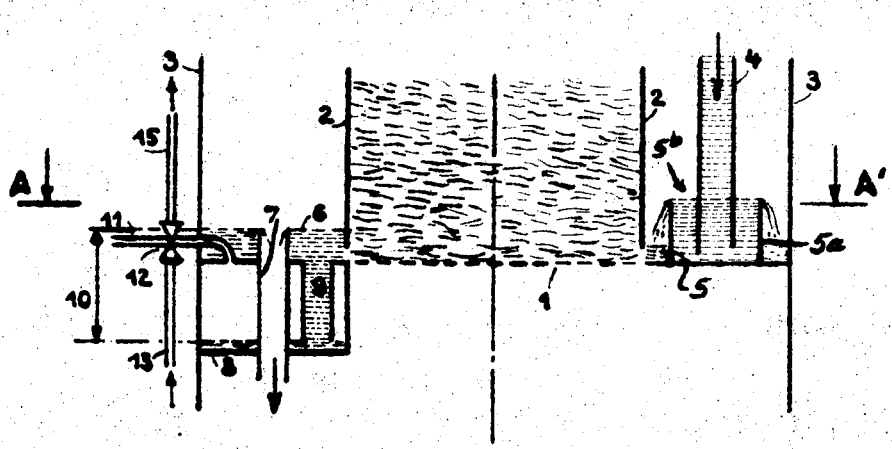
FIG. 1 is a diagrammatic view of a plate section of a contact tower embodying the features of this invention.
Figure 2:
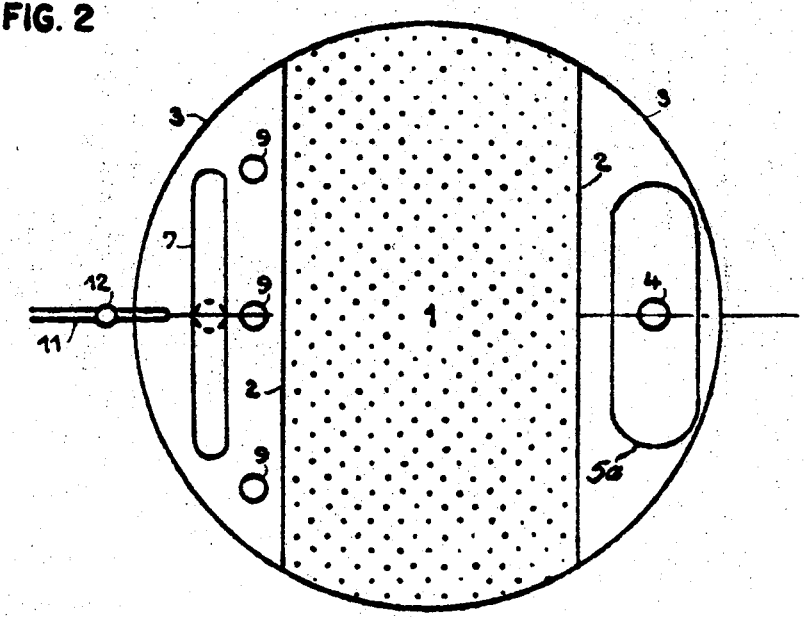
FIG. 2 is a top plan view of the plate as shown in FIG. 1, according to line A–A′.

Briefly described, the concepts of this invention are embodied in the construction of the plates with a container associated with each of the plates for receiving the liquid from the surface of the plate and for storage of the liquid during shutdown or when throughput of gas declines to a predetermined minimum whereby the fluid required for operation of the plate is retained in close vicinity of the plate and whereby the fluid from the plate is maintained in separated relation from the fluid of other plates thereby to retain the desired chemical balance of the fluid and from which the fluid is available for return to the corresponding plates for renewal of operation of the column with a liquid stabilized for continued efficient operation of the plate.

The container, hereinafter referred to as the retention box, is dimensioned to have a capacity sufficient to hold substantially all of the liquid that would otherwise flow from the plate during slowdown or shutdown or to hold at least an amount sufficient to enable the column to be started for continued operation under stabilized conditions.

The retention box communicates with the corresponding plate through at least one plunging tube through which the liquid can flow in either direction for drainage of liquid from the plate into the retention box or for flow from the retention box onto the plate for renewal of operations.

Another feature of this invention resides in the construction of the retention box with one or more non-plunging tubes that operate to expose the interior of the box to a predetermined pressure which, on the one hand, is either atmospheric pressure or a pressure maintained in an enclosure which is below the pressure existing in the column during normal operation to control the drainage of liquid from the plate into the box, and which, on the other hand, communicates with an enclosure maintained at a higher pressure to force return of the liquid from the box onto the plate.

The drainage of the plate is accomplished speedily, such as in 15 seconds, as soon as there is a shutdown or the circulation of the gas through the column is reduced in volume. Drainage is effected under the action of a higher pressure still prevailing in the area of the column above the plate, and possibly under the force of gravity while the retention box is simultaneously brought into communication with the atmosphere or lower pressure. The duration of the drainage is controlled in proportion with the permissible differential in pressure and the diameter of the plunging tubes. The return from the retention box is achieved subsequently when gaseous circulation through the column is again re-established at the desired level and when, at the same time, the communication between the retention box and the atmosphere is discontinued and the pressure inside the box becomes sufficiently high to force the fluid to rise through the plunging tubes for return onto the plate to re-establish conditions prior to stoppage.

It suffices, for the operation of the described apparatus, for the pressure in the retention box to fall faster than the pressure in the column during shutdowns, and for the pressure in the box to increase more rapidly than the pressure in the column during renewal of operations. In general, the pressures may be equal during shutdowns and very close during renewal operations. In all events, the pressure conditions in the retention box are controlled so that the fluid will be drained from the plate before the gaseous throughput in the column declines to a value sufficiently low to permit flow of fluid through the perforations of the plates. The minimum value may be predetermined to correspond to a critical state, such for example as in the order of $15/100$ of the normal gaseous throughput for the column. Likewise, the placing of the retention box under positive pressure is controlled so that the fluid is delivered to the plate from the time that the gaseous throughput has reached a sufficiently high value to militate against flow of fluid through the perforations.

The gaseous throughput and the pressure required for delivery of fluid may be controlled directly by the compressor which normally feeds the column or by any other source of gas under positive pressure. Often it is necessary for the pressures, called delivery pressures, exerted upon the inside of the retention box to be adjusted to the value of the absolute pressure prevailing in the column at the corresponding level, in order to keep track of the pressure drop sustained by the gases passing through the lower plates. The retention boxes are fed in series by a "high pneumatic" circuit and it is desirable to impose such load losses or pressure drops on the circuit that the pressure admitted to the interior of a retention box will be equal to or slightly greater than the pressure prevailing in the corresponding level of the column.

For such purpose, another feature of this invention resides in means to reduce the delivery pressure between two consecutive retention boxes, said reduction being substantially equal to the pressure drop of the gas, under normal operation, as it passes over a plate situated between the boxes, as by arranging on the high pressure air circuit an appropriate device capable of simulating the pressure drop. For example, use can be made of a fluid bubbler of a height equivalent to the load loss or pressure drop or use can be made of a baffle, a labyrinth, filling box, a constriction, a spring piston, or the like. Without this precaution, the pressure might turn out to be insufficient in the retention boxes at lower levels for returning the fluid and it may be too high in the retention boxes at the upper levels to cause high gas throughput.

The device selected to create this load loss or pressure drop should have, for example, the dimensions of the plunger tube of the bubbler. The smooth operation of the retention box requires the plunging tubes connected with its plate to be of sufficient dimension or sufficient in number to permit rapid flow of fluid from the plate before the pressure in the column has dropped completely following the shutoff or interruption of gaseous throughput.

Referring now to the drawings, the plate 1 is formed with a perforated media section surrounded by walls 2 spaced upwardly a short distance from the surface of the plate extending substantially the entire distance crosswise of the column 3. The plate 1 is fed with liquid through a conduit 4 which communicates with the plate located immediately above in the column. The conduit feeds onto a tray 5 surrounded by walls 5a which extend upwardly beyond the end of the conduit to provide a fluid bath in the form of a trap 5b to prevent entrance of gaseous phase from the column into the conduit. The fluid overflows from the trap onto the plate for the supply of liquid to the plate to form the liquid level overlying the perforated portions of the plate.

The retention box 8 is positioned below the plate to underlie a non-perforated portion of the plate. Normally, the retention box is practically empty except for a thin layer of liquid at the bottom of the box adapted to seal off the lower end of tubings 9 extending downwardly into the box from the upper surface of the plate. A column of fluid is maintained in the tubings 9 by the force of static pressure, referred to as delivery pressure, which is constantly exerted upon the fluid by pressure within the retention box. This static pressure or thrust is balanced with the pressures prevailing in the column above the corresponding plate plus the pressure of the fluid column 10 corresponding to a column of liquid for a height measured by the distance between the level of liquid in the retention box to the level of liquid on the surface of the plate, as measured by the entrance to the spillway.

In order to maintain the retention box in an emptied state ready to accommodate the fluid from the plate, it is desirable, under normal conditions, to permit a slight gaseous output by bubbling the gaseous material into the retention box to avoid the possibilities caused either by inadvertent drop in pressure in the retention box or temporary excessive increases in pressure in the column.

As illustrated in FIG. 3, in response to shutdown of the column, the retention box is automatically brought into communication with the ambient atmosphere or with an enclosure maintained at a pressure below the pressure prevailing at the corresponding level on the column. This is achieved by means of a low pressure passage 11 controlled by a three-way valve 12. For immediate response, the valve may be connected to the compressor feeding the gaseous material into the column for operation of the valve in response to pressure of the gaseous throughput. This enables the fluid on the plate to flow gravitationally through the tubings 9 at a rate corresponding to the difference in pressure thus created between the plate and the box.

When the normal gas throughput is restored, and in order to restore the column to normal operation, the valve 12 is operated automatically to discontinue communication between the box 8 and the atmosphere through the low pressure circuit 11. At the same time the box 8 is communicated with the high pressure circuit 13 to introduce high pressure ino the container whereby the fluid is forced from the box through tubings 9 for redistribution over the plate 1. It is maintained on the plate by the pressure conditions prevailing at the plate and it is usually emulsified by the gaseous phase rising through the perforations. The gases or vapors introduced into the retention box are preferably the same as the gaseous material circulated through the column although this condition is not essential.

When the balance or equilibrium between the pressure in the box 8 and the thrust of the fluid in the tubings 9 is restored, the system is again in the initial operating condition illustrated by FIG. 1.

The reversible operation of the retention box 8 is facilitated by the presence of the liquid bubble 14 in the high pressure pneumatic circuit 13, as illustrated in FIG. 4. The plunger tube 15 of a bubbler which connects two adjacent retention boxes 8 communicates with the lower box while the non-plunger tube 13 communicates with the upper retention box.

The design and arrangement of the elements necessary for placing the retention boxes into operation may be changed without altering the essential features of the invention. For example, it is possible to mount the fluid retaining device, including the bubbler and the pneumatic or air circuits, outside or inside the area of the column, or above or below the level of the plate. It is also possible to provide several retention boxes below each plate in which the smaller retention boxes are of a dimension and shape adapted to the available space, provided their total capacity at any given level is sufficient to accommodate the entire liquid contents on the plate, or at least a sufficient amount of fluid to make possible the restoration of the column to a stabilized operation. While communicating with the non-perforated part of the plate via the plunging tubings and with the atmosphere via an air circuit, the boxes may be in communication with each other or indepedent.

The fluid retention device, embodying the features of this invention, may be applied to any apparatus, tower or column which makes use of plates intended for the processing of a fluid charge for intimate contact between a fluid phase and a gaseous phase. For example, the device may be used to wash a gas with a fluid or to have one absorbed by the other whereby said absorption may or may not be accompanied by a chemical reaction between the two phases. It may be used to effect a heat exchange between the gas and the fluid or to effect between the two phases an exchange of material and/or heat. The device is also applicable for use as a rectifier which makes use of perforated plates and to extraction columns for use between a fluid and a fluid or a fluid and a gas, or separation columns wherein separation is effected by distillation or absorption, or to desorption columns, containers, evaporators, and generally to any material and/or heat exchange column.

Said fluid retention device is applicable to plate columns used for the fractionation distillation of fluid mixtures for separation of ingredients, it is applicable to processes requiring use of perforate plate columns which, for reason of their structure, become emptied in response to drop in gaseous pressure below a predetermined value.

An embodiment is hereinafter described which makes use of the practice of the invention in a device adapted for use on a commercial scale; which illustrates it is applicable in a perforate plate absorption column which makes use of spillways or overflows as in the production of nitric acid where the nitrogen oxides to be absorbed and oxidized are circulated upwardly in countercurrent flow with the absorbing fluid flowing downwardly through the column from plate to plate. In the illustrated embodiment, each plate of the column has a diameter of 4.2 meters. Taking into account the amount or volume emulsified on the plate, it makes use of a retention box having a capacity of 0.8 cubic meter which is placed inside the column beneath the plate near the evacuation spillway. The retention box occupies a surface of 0.815 square meter or about 5.9% of the total plate area and it has a depth of 1 meter. The retention boxes of the various plates are fed in series by the air circuit with the intervention of bubblers adapted to the load loss on each of the plates.

The absolute pressure exerted on the first plate is 3.410 kg./cm.$^2$ and the amount of pressure in the retention box exceeds the plate pressure by 0.120 kg./cm.$^2$ which is 3.5% of the pressure of the gases at the entrance so that the absolute pressure in the box is 3.50 kg./cm.$^2$.

The height of the plunger tube of each bubbler or mixer, located between two consecutive retention boxes, depends upon the density or specific gravity of the liquid contained therein. In the illustrated modification, use is made of a fluid identical in composition and concentration to the one that is emulsified on the plate when under continuous operation. The drop of pressure between these boxes is maintained so that the load loss of the pneumatic current between two plates corresponds to the load loss sustained by the gases in the column during the passage through the corresponding loaded or charged plate. Thus, for indication, the drop of pressure between the first and second retention boxes is assumed to be 0.022 kg./cm.$^2$; the length of the plunger tube of the bubbler or mixer placed between these two boxes and containing nitric acid (specific gravity 1.38 kg./dm.$^3$) is 0.156 meter. The drop of pressure between the second and third retention boxes is 0.0193 kg./cm.$^2$ and the plunger tube of the bubbler wedged between these two boxes and containing the same nitric acid (1.38 kg./dm$^3$) measures 0.14 meter in length. The height of acid on the plate is 0.06 meter, when in the non-emulsified state, and the total plate surface is 13.85 m.$^2$. The inside diameter of the tubing provided for the flow of acid to the retention boxes is 0.09 meter. Under these conditions, the effective pressure inside the column is 2.41 kg./cm.$^2$ and the concentration of nitric acid is 60%. The entire quantity of fluid held on the plates flows into the retention boxes in about 15 seconds from the time that the boxes are put into contact with the atmosphere.

This embodiment shows the possibility of complete retention of a gaseous emulsified fluid upon removal from a perforate plate, provided with an overflow, as soon as the gas circulation in the column is stopped. The retention means described has no moving parts such that it needs no maintenance and is protected against mechanical failure since it operates only in response to variations in pressure. The superpressure required for correct operation of the column, equal to the difference in pressure corresponding to the load between the plate and the retention box, represents only a very small part of the total energy needed for operation of the column.

It will be apparent from the foregoing that the invention provides a simple and efficient means for use in operation of contact towers using perforate plates whereby the fluid composition on each plate may be retained and the fluid reserved during non-use or inefficient use of the column for return of the plate and the column to normal operating conditions.

It will be understood that changes may be made in the details of construction, arrangement and operation without departing from the spirit of the invention, especially as defined in the following claims.

We claim:
1. In a column which makes use of perforated plates for effecting intimate contact between two fluid phases wherein a first fluid passes downwardly through the column in countercurrent flow with a second fluid which passes upwardly through the column, the improvement which comprises a container associated with a plate having a capacity sufficient to accommodate an amount of the first fluid from the surface of the plate to renew stabilized conditions upon return of the first fluid onto the surface of the plate for continued operation of the column, means communicating the surface of the plate with the container for the flow of the first fluid from the plate into the container and from the container onto the plate, means responsive to diminution of the flow of the second fluid upwardly through the plate into contact with the first fluid present as a layer on the surface of the plate to effect flow of the first fluid from the surface of the plate into the container, and means responsive to the renewal of flow of the second fluid in sufficient volume upwardly through the plate in renewal of operations of the column to force return of the first fluid from the container onto the surface of the plate.

2. In a column which makes use of perforated contact plates for effecting intimate contacting relationships between a liquid flowing downwardly through the column and a gas flowing upwardly through the plates in countercurrent flow with the liquid through the column whereby an operating pressure exists above each plate in the column and in which stabilized layer of liquid is formed on each plate during normal operation of the column, the improvement which comprises a container associated with the plate and dimensioned to have a capacity to hold an amount of liquid at least sufficient to renew the stabilized condition upon return of the liquid to the surface of the plate for continued operation of the column, means communicating the surface of the plate with the container for the flow of liquid from the surface of the plate into the container and for the flow of liquid from the container onto the surface of the plate, a source of low pressure which is below the pressure above the plate during normal operation of the column, another source of high pressure which is above the pressure above the plate during normal operation of the column, and means for communicating the interior of the container with said pressure sources to shut off communication with said high pressure source and to communicate the interior of the container with said low pressure source to enable drainage of liquid from the surface of the plate into the container and to shut off communication with said low pressure source and communicate the interior of the container with said high pressure source to force return of liquid from the container onto the surface of the plate.

3. A column as claimed in claim 2 in which the means for shutting off the communication between the container and the high pressure source and for establishing communication between the container and the low pressure source is responsive to the reduction in the volume of gas circulated upwardly through the column below a predetermined minimum.

4. A column as claimed in claim 2 in which the means for shutting off communication between the container and the low pressure source and for communicating the container with the high pressure source is responsive to the renewal of the flow of the gas through the column at a rate corresponding to normal operation.

5. A column as claimed in claim 2 in which the container is positioned below the plate.

6. A column as claimed in claim 2 in which the container is dimensioned to have a capacity to hold all of the liquid on the surface of the plate.

7. A column as claimed in claim 2 in which the container underlies an imperforate portion of the plate.

8. A column as claimed in claim 2 in which the container is subdivided into a number of separate containers.

9. A column as claimed in claim 2 in which the means communicating the surface of the plate with the container comprises a conduit extending continuously from the surface of the plate downwardly to adjacent the bottom of the container.

10. A column as claimed in claim 9 in which the container has an amount of liquid in the bottom to engage the lower end of the conduit to seal the conduit in a manner to prevent passage of gases from the housing.

11. A column as claimed in claim 2 in which the low pressure source comprises the atmosphere.

12. A column as claimed in claim 2 in which the means communicating the interior of the container with said pressure sources comprises separate conduits communicating the container with said pressure sources and which includes a valve for opening and closing the communication between the container and said conduits.

13. A column as claimed in claim 2 which includes a bubbler having liquid therein and a plunger tube extending downwardly to below the liquid level and in which the bubbler interconnects the container for one plate with the container for an adjacent plate and in which the plunger tube communicates the bubbler with the lower of the containers and in which a non-plunging tube communicates the bubbler with the upper of the containers.

14. A column as claimed in claim 13 in which the height of the liquid in the bubbler above the end of the plunger tube is related to the pressure drop across the plates.

No references cited.

HARRY B. THORNTON, *Primary Examiner.*

E. H. RENNER, *Assistant Examiner.*